United States Patent [19]

Holderman

[11] Patent Number: 5,174,468
[45] Date of Patent: Dec. 29, 1992

[54] TRASH ORGANIZER

[76] Inventor: Lisa A. Holderman, 4804 NW. 82nd Ave., Lauderhill, Fla. 33351

[21] Appl. No.: 649,306

[22] Filed: Jan. 30, 1991

[51] Int. Cl.[5] .............................................. B65D 1/36
[52] U.S. Cl. .................................. 220/571; 220/403; 220/404; 220/909
[58] Field of Search .............. 220/571, 909, 404, 403, 220/401

[56] References Cited

U.S. PATENT DOCUMENTS

| 1,928,594 | 8/1933 | Kearney | 220/571 |
|---|---|---|---|
| 2,561,143 | 7/1951 | Schmitz | 220/401 |
| 2,625,973 | 1/1953 | Weldon et al. | 220/909 |
| 3,074,583 | 1/1963 | Martinich, Jr. | 220/401 |
| 4,801,034 | 1/1989 | Sandomeno | 220/909 |
| 4,905,853 | 3/1990 | Strawder | 220/909 |
| 4,988,010 | 1/1991 | Pollak | 220/909 |
| 5,005,727 | 4/1991 | Roth | 220/909 |

FOREIGN PATENT DOCUMENTS 623839 4/1948 United Kingdom ............... 220/571

Primary Examiner—Joseph Man-Fu Moy
Attorney, Agent, or Firm—Malin, Haley, McHale, DiMaggio & Crosby

[57] ABSTRACT

An improved trash organizer for expeditious separation of paper, aluminum, glass, plastic or other separable trash items that provides for a small, compact primary trash container with separate compartments that includes reusable net bags and a drainage system for removal of excess residual liquids, and having a removable collecting pan for excess liquid. A secondary separable trash container may be included for outdoor use.

3 Claims, 2 Drawing Sheets

TRASH ORGANIZER

BACKGROUND OF THE INVENTION

1. Field of the Invention

A trash organizer, transfer, and removal system for separating specific trash items such as paper, aluminum cans, glass products, plastics or other separable trash items that includes the use of a reusable net bag container within each separating bin for collecting and transferring each separate trash item while permitting drainage of liquids from each separating bin for safe and hygienic removal of excess liquids, and a transport container.

2. Description of the Prior Art

The recycling of selected items of trash has become mandatory in many municipalities throughout the country because recycling is an efficient way of trash disposal when done at a basic source level such as a home or apartment. Presently plastic bags (which themselves are a pollution problem) are used for segregating various items of trash. Typically plastic "garbage" bags are used for containing separated trash items such as plastic, glass, aluminum cans and paper. One problem encountered with separated trash and especially items such as aluminum cans, glass and plastic bottles is residual liquids in trashed cans and bottles which spill, drain and accumulate in the bottle and can trash containers.

Compartmented waste receptacles and trash receptacles themselves have been shown in the prior art. U.S. Pat. No. 4,834,262, issued to Reed, May 30, 1989, shows a trash separation container which provides for the use of plastic bags installed within each compartment. U.S. Pat. No. 4,867,328, issued to McCarthy, Sep. 19, 1989, shows a sectionized trash receptacle in which the section sizes can be altered.

One of the drawbacks in the use of these segregated trash separating containers is unwanted liquids resulting from spillage from cans and bottles which collects in the bin, requiring constant cleaning. One solution has been the use of plastic garbage bags for inner liners for transferring and retrieving the separated trash. The use of the plastic garbage bags themselves continues to create environmental problems in that the volume and longevity of plastic becomes a pollution problem.

The present invention overcomes the problems of the prior art by providing a primary compartmentized trash container of compact size that allows for expeditious segregation of various trash items such as paper, aluminum, glass and plastic with the use of a permanent mesh or net-like liner, such as a net or fabric mesh bag, that will permit drainage of any residual liquids in the trash through a drain in the bottom of each individual compartment into a collecting tray mounted at the bottom of the trash receptacle and, that will not tear or cut for permanent reuse. In addition, an outdoor or secondary trash container having individual removable bins may be utilized for transporting trash from an individual home or apartment for outdoor collection while still maintaining the segregated integrity of each of the separable trash items, without need for the bag liners.

BRIEF SUMMARY OF THE INVENTION

A primary trash container for separating in individual compartments different items of trash such as paper, aluminum cans, glass and plastic comprising a rigid container having a plurality of individual compartments vertically disposed for access from the top of the trash container, a plurality of individual net mesh bags each sized to fit within an individual compartment within the trash container, each compartment having a drain for draining liquids along a bottom floor, and a liquid receiving drawer disposed at the bottom of the trash container movable and removable from the trash container for collecting residual liquids received on the floor of the container through the drain.

The mesh liner bag may be made of a woven-like plastic, rubber or other durable water-impervious material with sufficient spacing between the fabric members to permit liquid to flow therebetween but small enough to retain items such as pieces of glass, cans and bottles. An example would be a one-quarter inch opening dimension. In one embodiment the mesh bags may be rectangular in cross section along the longitudinal axis to fit within the individual rectangular compartments. Each compartment may have fastening pegs along the top walls to removably fasten each bag within a compartment to keep the bag open and accessible for depositing the particular item of trash to be separated. When an individual mesh trash bag is filled, it can be conveniently and quickly removed from the individual compartment.

The bottom floor of the primary trash container includes a sloping drainage area and drain opening for each individual compartment. Each floor includes a central opening unitarily formed in a molded grate or mesh of the same material that allows liquids to pass through. Beneath the floor is a removable pan having an outside handle for actuation which has a liquid impervious wall and floor structure to contain residual liquids flowing through the drains into the pan.

When used by an individual home owner or apartment dweller for individually segregating trash, the recycling trash system includes a separate secondary outdoor trash container including individualized compartments without bag liners, each of which is mounted on a housing with wheels and handle so that the contents from each individual mesh bag in the primary trash container can be emptied into another individual compartment in the outdoor trash container. Each mesh liner bag is immediately returned after being emptied to the primary trash container. Since any residual liquids will have been removed while in the inside trash container, the outdoor trash container does not need individual mesh liner bags or a drain but can use separate compartments without bags. The primary trash container is intended for indoor use, while the secondary container is used for transport and outdoor storage.

In a typical environment, the indoor primary trash container shown in accordance with the present invention could be sized small enough for placement within the home or apartment in a convenient area for collecting and segregating individual trash. The use of the present invention however eliminates the use of at least three or four plastic bags for each trash container in a single household, greatly reducing the overall volume of plastic garbage bags being used by society as a whole. The present invention eliminates the problems of attempting to keep individual compartments free of residual liquids while providing a convenient removable collecting pan that can be quickly and easily drained and cleaned.

It is an object of this invention to provide an improved trash container that separates individual trash items such as paper, aluminum, plastic and glass in individual compartments. It is another object of this invention to provide an improved segregated trash container that utilizes a reusable mesh bag for each segregated item of trash eliminating the need for consumption of plastic garbage bags while maintaining the cleanliness and eliminating collection of undesirable liquids found in many of the container.

It is yet another object of this invention to provide a trash segregating and storing container system that provides for both indoor and outdoor trash separation and storage while providing for convenient and hygenic removal of residual liquids that may collect in the trash.

In accordance with these and other objects which will be apparent hereinafter, the instant invention will now be described with particular reference to the accompanying drawings.

PREFERRED EMBODIMENT OF THE INVENTION

Figure 1:
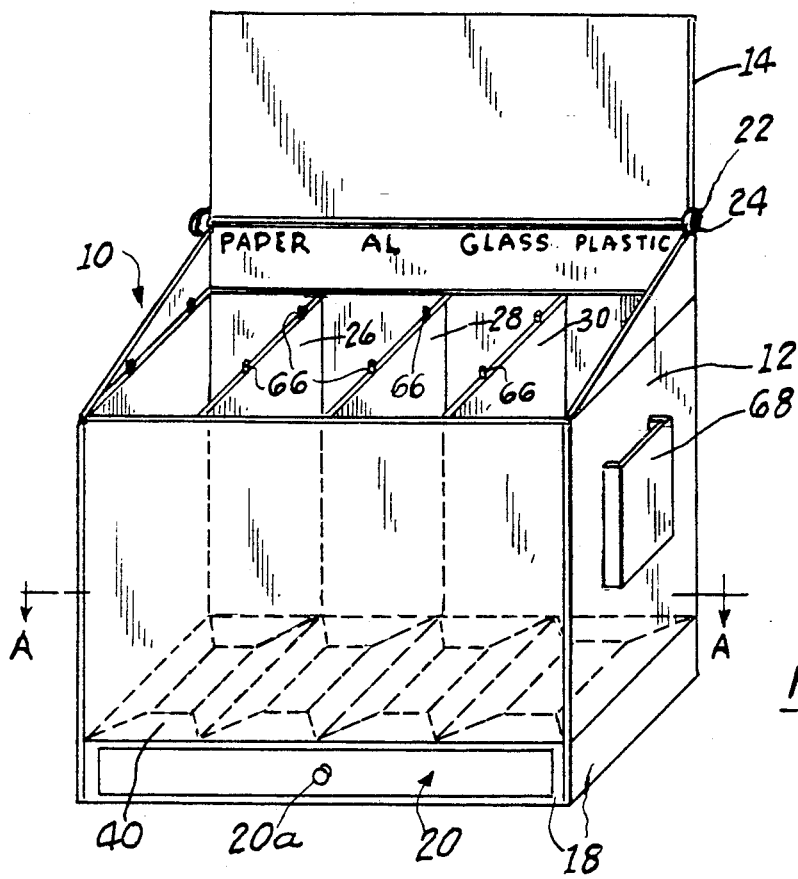
FIG. 1 shows a front perspective view of the primary trash container of the present invention.

Referring now to the drawings and specifically FIG. 1, the primary container used in the present invention is shown generally at 10 comprised of a rigid rectangular container 12 having front and back walls and two side walls vertically disposed and unitarily constructed together and a rigid floor panel 40 joined along the bottom portion of container 12. In addition, a plurality of vertical partitions 26 are uniformly disposed within the container 12 vertically to provide, as shown in this example, four separate individual bins with the panels 26, 28 and 30 reaching vertically to the floor 40 so that four separate compartments are defined within container 12. The top edge of the barriers 26, 28, and 30 and the side walls of the container each have a pair of vertical pegs which are used to fasten a mesh liner bag (shown in FIG. 3) within each individual compartment.

The container 12 is supported by a vertical stand 18 which surrounds the base of container 12 such that container floor 40 may be a few inches (four or less) above the ground floor. Also removably mounted within the front base board 18 is a removeable drawer-like pan 20 having a handle 20a. The pan walls 20b and pan floor 20c are sealed around their edges so that the pan can collect liquid without leakage from the pan. The pan 20 is removed as necessary to inspect and clean and if necessary dispose of residual liquids.

Figure 2:
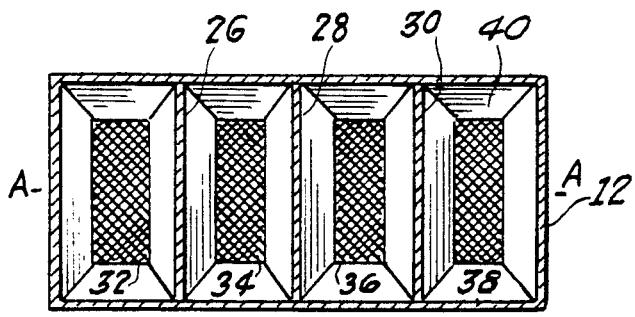
FIG. 2 shows a top plan view in cross section through line A—A of FIG. 1.

Referring now to FIG. 2, the floor 40 of the trash container 12 is shown containing a plurality of integrally molded screen or grate-like apertures 32, 34, 36 or 38 which act as a drain for each individual compartment shown separated by the vertical barrier walls 26, 28 and 30. The screen within each aperture 32, 34, 36 and 38 permits liquids which collect or drain from various trash items disposed within each compartment to drain past floor 40 and be received into the collecting pan 20 at the very bottom of the trash unit. The floor portions surrounding the apertures ma be sloped downwardly from the exterior toward the drains so that any liquid falling on floor 40 would drain towards and through the respective apertures provided in the floor.

Figure 3:
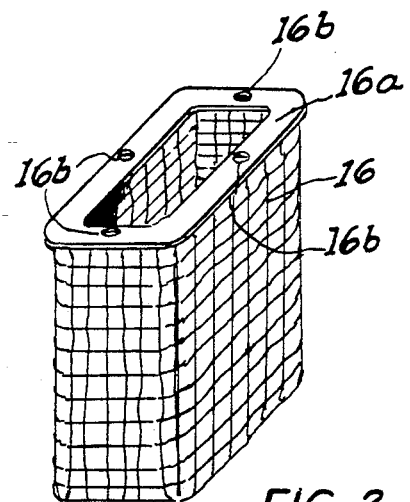
FIG. 3 shows a perspective view of an individual mesh fabric liner bag used in the present invention.

FIG. 3 shows a mesh or net trash receiving liner bag 16 which is shown as rectangular in shape to be sized and shaped to fit snugly within each individual compartment shown in FIG. 1. Each individual mesh liner bag 16 has a woven-like fabric material with sufficient spacing between the individual woven-like members to permit drainage of any residual liquids that are spilled or pour out of trash items such as cans, glass bottles, or plastic bottles that are disposed of in the trash container 12. The residual liquids anticipated can range from toxic solvents and cleaners to alcoholic beverages. The spacing between the mesh weaves, may be small enough so that very small objects will be retained within the liner bag 16 for trash storage and transfer purposes. The material used to create the mesh bag 16 may be plastic or the like to be impervious to liquids that pass therethrough. The top opening may include a fabric band 16a made of the same material having small holes 16b used to attach the bag 16 to pins 66 in each compartment.

Figure 4:
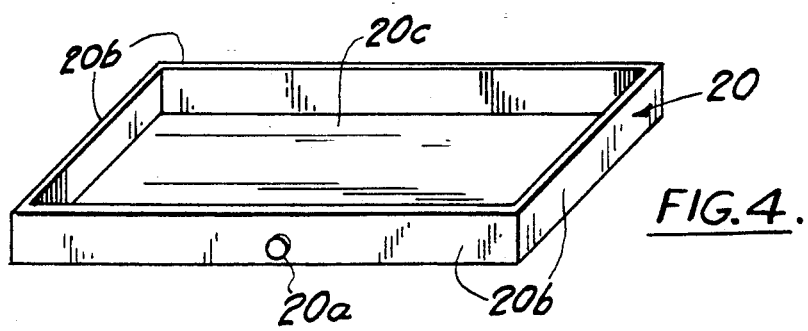
FIG. 4 shows a perspective view of the liquid collecting pan used in the present invention.

FIG. 4 shows the collecting pan 20 which is substantially rectangular and sized to span most of the floor 40 shown in the trash container 12 of FIG. 1 s that all liquids passing through the screen apertures 32, 34, 36 and 38 (FIG. 2) will be retrieved and collected within the water-impervious pan 20. The pan may be quickly and conveniently removed from the support housing 18 for drainage and cleaning when desired.

The mesh or net woven trash bag 16 shown in FIG. 3 is designed for insertion within each individual compartment shown in the trash container of FIG. 1. The fastening pegs or pins 66 are used to permit each bag lip 16a having holes 16b to be fastened on all sides while the bag is disposed within each trash bin in container 12. The net woven bags 16 are intended for permanent reuse with the trash container 12 and are used to collect and permit transfer of any trash received therein. Once trash is emptied from the liner bag 16, the bag is reinserted back into the individual trash compartments in container 12. This eliminates the use of conventional plastic garbage bags which themselves contribute to overall pollution problems because of the volume of plastic bags currently being consumed daily. The liner bag 16 material selected is sufficiently strong to resist any tears or cuts from articles of trash placed in the bags.

Figure 5:
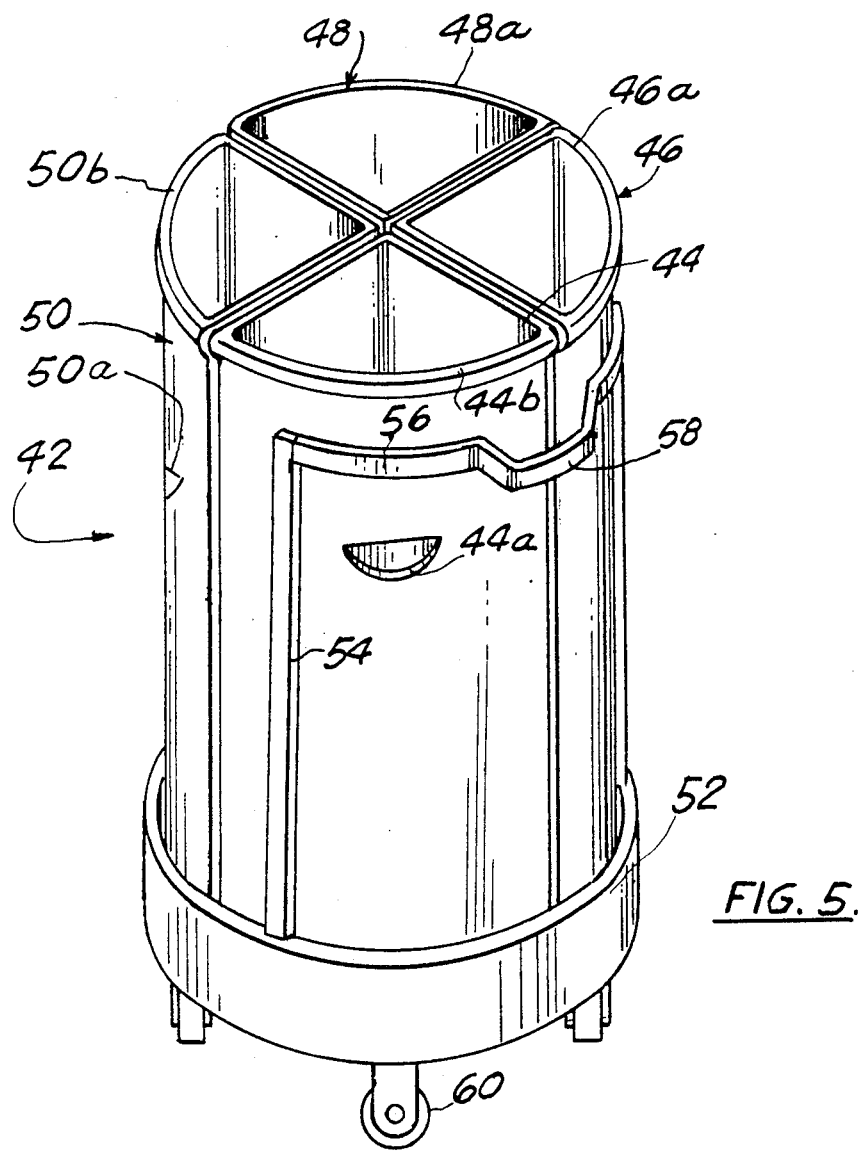
FIG. 5 shows a perspective view of an outdoor segregatable trash container which may be used with the present invention.
Figure 6A:
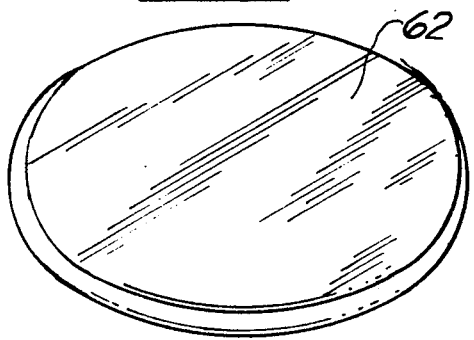
FIG. 6A shows a perspective view of the lid or top cover used with the secondary outdoor trash container as shown in FIG. 5.
Figure 6B:
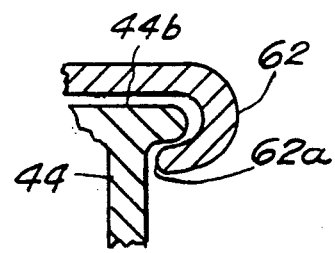
FIG. 6B shows a cut-away side elevational cross section of the top cover and container lip for the secondary container.

In FIG. 5, a secondary trash container for outdoor use is shown generally at 42 comprised of four individual trash receptacles 44, 46, 48 and 50 each of which has a pair of walls at right angles joined to a quarter circular wall so that all four receptacles fit tightly within a base support 52 having a raised wall portion encircling the four individual trash receptacles and firmly supporting them within the housing 52 which itself is cylindrical. Receptacles 44 and 50 include recessed handles 44a and 50a for lifting. The bottom of the support housing 52 has mounted thereon wheels 60, at least two, to allow movement of the outdoor trash container 42 through the actuation of handle 58 attached to supporting bars 56 and mounting bar 54 attached to the individual container support housing 52. Thus the individual compartments 42, 44, 46, and 48 rest on a floor at the bottom of the cylindrical housing 52 that is horizontally disposed to which the wheel 60 may be attached. FIG. 6A shows a circular lid 62 which is used to cover the individual compartments 44, 46, 48 and 50. FIG. 6B shows the top retaining lip 44*b* on receptacle 44 (similar on the other receptacles 46, 48, and 50) that engages the recessed channel 62*a* in the top cover to hold the top 62 to all the receptacles keeping the receptacles 44, 46, 48, 50 together.

The secondary trash container 42 is intended for outdoor use in conjunction with the primary indoor trash container 10 shown in FIG. 1 as follows. As each individual compartment in indoor trash container 10 becomes full, the mesh liner bag 16 housed in the individual compartment of trash container 12 is quickly and easily removed with the trash therein being emptied into the individual compartment in the outdoor trash container 42. Since any residual liquids would have been drained in indoor trash container 10, again separate sealed plastic bags are not necessary for the storage of paper, cans, glass or plastic within any individual compartment 44, 46, 48 and 50 shown in the outdoor trash container 42. Thus, the outdoor trash container 42 can store the segregated trash until it is time for removal which normally would be movement of the outdoor trash container 42 to some outdoor location where a truck would pick up the trash. At that time, the segregated compartments can be individually removed from the support housing 52 so that whatever contents are disposed within an individual receptacle can be conveniently emptied into the truck by the attendant.

In construction, any suitable plastic, rubber-like or plastic-like somewhat rigid material may be used for the primary and secondary trash container walls, compartment walls, floor and support base and cover 14 as shown in FIG. 1. Likewise, the same material may be used for the collecting pan 20. A separate junk mail receptacle 68 may be affixed to an outside wall 12 to separate junk mail.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. A trash organizer for separating specific trash items such as paper, aluminum cans, glass products, and plastics comprising:
    a trash container for temporarily storing a variety of separated trash items, said container including a plurality of individual compartments;
    a fluid recovering means disposed as the bottom of each of said individual compartments for recovering waste fluids released from various items of trash; and
    a second trash container having a plurality of individually moveable compartments, disposed to fit together, a base support having a raised peripheral wall for encircling and retaining said plurality of individual compartments in a vertical position, said second container including ground engaging roller means attached to said base support and an extending handle whereby separated trash from said first trash container may be emptied into specific individual compartments in said second trash container to maintain continuous trash item separation within said second trash container for moving trash a predetermined distance as from a house to curb for pick-up.

2. A trash organizer for separating specific trash items such as paper, aluminum cans, glass products, and plastics comprising:
    a trash container for temporarily storing a variety of separated trash items, said container including a plurality of individual compartments; a fluid recovering means disposed as the bottom of each of said individual compartments for recovering waste fluids released from various items of trash;
    at least one bag formed from a net fabric disposed within at least one of said individual compartments and sized to fit within an individual compartment for receiving trash items and retaining them within the bag while permitting waste liquids within any trash item to drain freely out of the bag into the recover means; and
    a second trash container having a plurality of individually moveable compartments, disposed to fit together, a base support having a raised peripheral wall for encircling and retaining said plurality of individual compartments in a vertical position, said second container including ground engaging roller means attached to said base support and an extending handle whereby separated trash from said first trash container may be emptied into specific individual compartments in said second trash container to maintain continuous trash item separation within said second trash container for moving trash a predetermined distance as from a house to curb for pick-up.

3. A trash organizer for separating specific trash items such as paper, aluminum cans, glass products, and plastics comprising:
    a trash container for temporarily storing a variety of separated trash items, said container including a plurality of individual compartments;
    a fluid recovering means disposed as the bottom of each of said individual compartments for recovering waste fluids released from various items of trash;
    a bag sized and shaped to fit within an individual compartment, said bag constructed of a water-impervious fabric and having a plurality of mesh-like openings for drainage of liquids within said bag and;
    a second trash container having a plurality of individually moveable compartments, disposed to fit together, a base support having a raised peripheral wall for encircling and retaining said plurality of individual compartments in a vertical position, said second container including ground engaging roller means attached to said base support and an extending handle whereby separated trash from said first trash container may be emptied into specific individual compartments in said second trash container to maintain continuous trash item separation within said second trash container for moving trash a predetermined distance as from a house to curb for pick-up.

* * * * *